United States Patent

Neefe

[11] Patent Number: 5,041,250
[45] Date of Patent: Aug. 20, 1991

[54] POLYMER BONDING GRAINS OF SAND USING STYROFOAM FLUFF AS AN ADHESIVE

[76] Inventor: Charles W. Neefe, P.O. Box 580, Angel Fire, N. Mex. 87710

[21] Appl. No.: 624,660

[22] Filed: Dec. 10, 1990

Related U.S. Application Data

[63] Continuation-in-part of Ser. No. 516,354, Apr. 30, 1990, Pat. No. 4,997,609.

[51] Int. Cl.⁵ ............................................. B29C 43/02
[52] U.S. Cl. ..................................... 264/115; 264/37; 264/122; 264/DIG. 69
[58] Field of Search ................. 264/37, 122, 115, 116, 264/129, 125, 126, DIG. 69; 427/212

[56] References Cited

U.S. PATENT DOCUMENTS

| | | | |
|---|---|---|---|
| 3,671,615 | 6/1972 | Price | 264/122 |
| 3,804,935 | 4/1974 | Potter et al. | 264/122 |
| 3,897,527 | 7/1975 | Ringdal | 264/37 |
| 3,956,541 | 5/1976 | Pringle | 264/122 |
| 4,115,497 | 9/1978 | Halmo et al. | 264/115 |
| 4,225,640 | 9/1980 | Erb | 264/115 |
| 4,279,790 | 7/1981 | Nakajima | 264/122 |
| 4,681,719 | 7/1987 | Vogel | 264/122 |

Primary Examiner—Mary Lynn Theisen

[57] ABSTRACT

A method of making useful objects by coating grains of sand with a thin film of styrene. The styrene coating is made by making styrofoam into styrofoam fluff by providing a plurality of tearing members around a cylinder. Rotating the cylinder and tearing members and subjecting the surface of the styrofoam to the rotating tearing members. The moving tearing members rupture the styrofoam surface and tear away pieces of the styrofoam, forming styrofoam fluff. The fluff has a sectional density less than the styrofoam from which the styrofoam fluff was made. The styrofoam fluff is mixed with sand, the mixture heated, the styrofoam fluff melts and forms a coating on the sand particles.

5 Claims, 2 Drawing Sheets

POLYMER BONDING GRAINS OF SAND USING STYROFOAM FLUFF AS AN ADHESIVE

This is a continuation-in part of application Ser. No. 07/516,354 filed Apr. 30, 1990, now U.S. Pat. No. 4,997,609, by Charles W. Neefe entitled "Polymer Bonding Grains of Sand to Form Useful Objects."

Polymer usage has increased yearly for the past fifty years. The types of polymers available have also increased. New polymers are introduced in the market each year; these new plastics have different physical and chemical characteristics such as melt temperature, hardness and solubility. The reuse of this multitude of plastic materials having widely different physical and chemical properties is most difficult. The separation of polymer types is impossible by visual inspection. Some polyethylene, polyacrylonitrile, polystryene, polyesters, polyethylene terephthalate, and polypropylene look and feel much the same, but may have different melt temperatures. High density and low density polyethylene have greatly different properties. Removing labels from containers and residues from within containers is also an economically impossible task.

IN THE DRAWINGS

SUBJECT OF THE INVENTION

Figure 1:
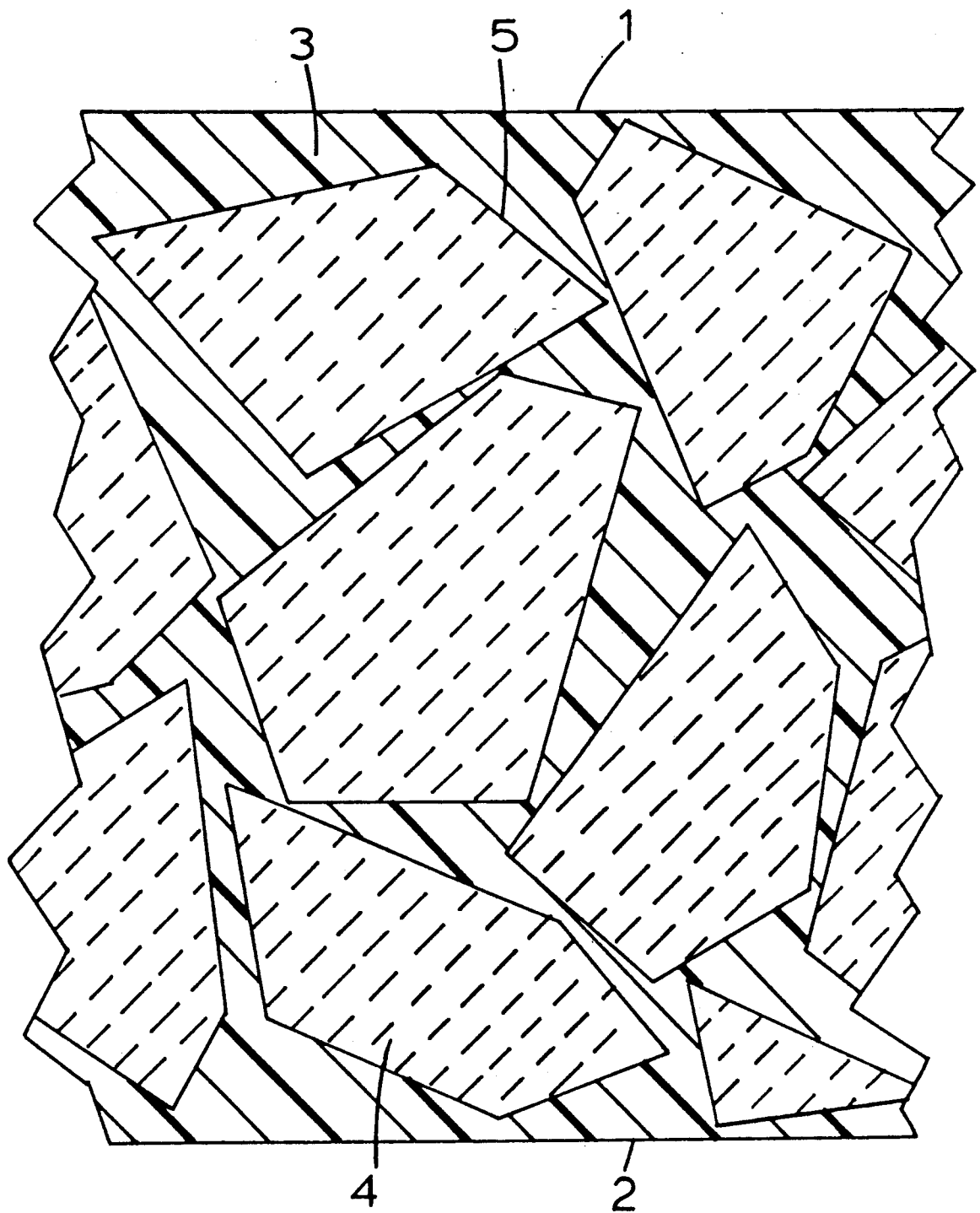
FIG. 1 shows the polymer and sand mixture in section.

A method has been developed whereby empty polymer containers can be granulated, mixed with sand and reused to make useful objects without sorting, removing labels or cleaming containers.

TYPES OF POLYMERS USED

The most plastics obtained by direct polymerization are also those which are the most important in terms of production volume, namely the polyolefins, the vinyl chloride polymers and the styrene polymers. These three polymers account for about 67% (polyolefins 33%, vinyl chloride polymers 20% and styrene polymers 14%) of the total annual plastic production in the West. The most important polyolefins are the polyethylenes and polyproplenes.

Thermoplastics are plastics which soften when heated but harden again when they are cooled, and this allows them to be shaped very easily. Softening and rehardening does not significantly alter the properties of a thermoplastic. As it is heated a thermoplastic first becomes elastic, like rubber, and then completely plastic, like a very viscous liquid.

Extrusion moulding, carried out in an extruder, is a common method of shaping thermoplastics. An extruder consists of a heated pressure-resistant barrel in which there is a helical screw, as in a domestic mincer (meat grinder). The screw conveys granules of the plastic through a heated die at a temperature of about 200° C. (392° F.) and a pressure of from 100 to 300 bar (1450 to 4350 psi) A wide variety of differently shaped products can be made by this method, depending on the shape of the die aperture. If it is circular, rods or filaments are produced, if it is annular, pipes and tubes are formed and if it is a slit, plastic sheeting or film will be produced. The continuous products emerging from the extruder die are cooled by air, water, cooled rollers or by contact with cooled metal surfaces which give the final exact shape to the section. The finished product is then rolled up or cut into suitable lengths.

Injection moulding is one of the most important methods of producing shaped articles in large numbers. As in an extruder, the plastic is softened by being passed along a heated barrel by means of a screw. However, the screw has the additional function of a ram, which injects the softened plastic very rapidly into a cooled steel mould at temperatures of from about 180° to 300° C. (336° to 572° F.) and pressures of 1000 bar (14,500 psi) or more, After cooling, the mould opens and the article is removed.

Blow moulding is a process used to manufacture hollow articles with small openings such as bottles, cans, drums, tanks and toys. A piece of softened plastics (frequently polyethylene) tubing is extruded and introduced into a two-piece blow mould. As the mould closed it presses one end of the tubular section together to seal it. Compressed air is blown into the other end of the tube until it fits against the cooled mould and solidifies. The mould is then opened and the article is removed.

Thermoforming is a process for making shaped articles such as bowls or beakers from plastic sheeting or film. The sheeting or film is heated with infra-red radiation to a temperature of between 120° and 180° C. (248° to 356° F.) until it is soft. It is then sucked against single-section mould by applying a vacuum. After cooling (solidfying), the moulded article is separated from the remainder of the sheet.

In rotational moulding, plastics powder is placed in a heated hollow mould of metal, and the latter is rotated slowly about two axes which are perpendicular to each other. In this way the powder melts and is distributed evenly over the whole inner surface of the mould. After cooling, the mould is opened and the moulded hollow articles is removed.

Thermosetting resins may also be used in quantities found in plastic containers. Thermosetting plastics are not commonly used for packing due to the high cost of fabrication. The small quantities used are welcomed in the granulated mix.

Resins such is polyethylene have a stable molecular structure and survive many years under severe atmospheric conditions. This fact makes them useful for many outdoor applications such as boat docks and fence posts.

THE INVENTION IS CARRIED OUT AS FOLLOWS

The empty plastic containers with labels outside and residue inside are passed through a standard plastic granulator and reduced to small pieces resembling multicolored sawdust. Sand coated with melted styrofoam fluff is mixed with the granulated plastic and heated to form useful objects.

Styrofoam fluff is prepared by obtaining used styrofoam objects and tearing small individual pieces away from the styrofoam surface.

Cutting, chopping and granulating closes the hollow cells which form the styrofoam body. Cutting or chopping increases the specific gravity and sectional density of the chopped styrofoam mass.

The pulling and tearing away individual pieces of styrofoam reduces the specific gravity and sectional density of the styrofoam fluff. A cubic foot of styrofoam fluff may weigh less than one-fourth that of a cubic foot of the styrofoam from which the fluff was made.

Figure 2:
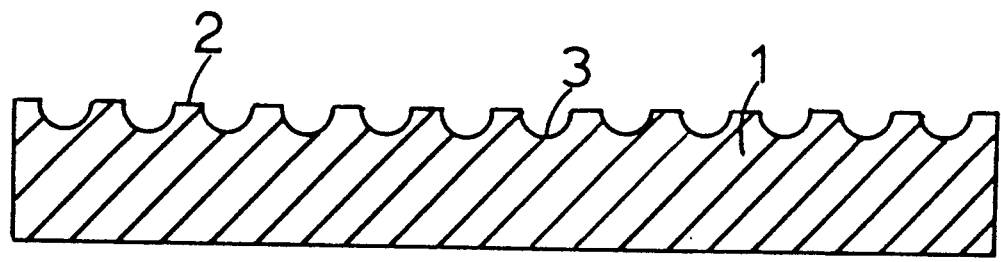
FIG. 2 shows the blade.
Figure 3:
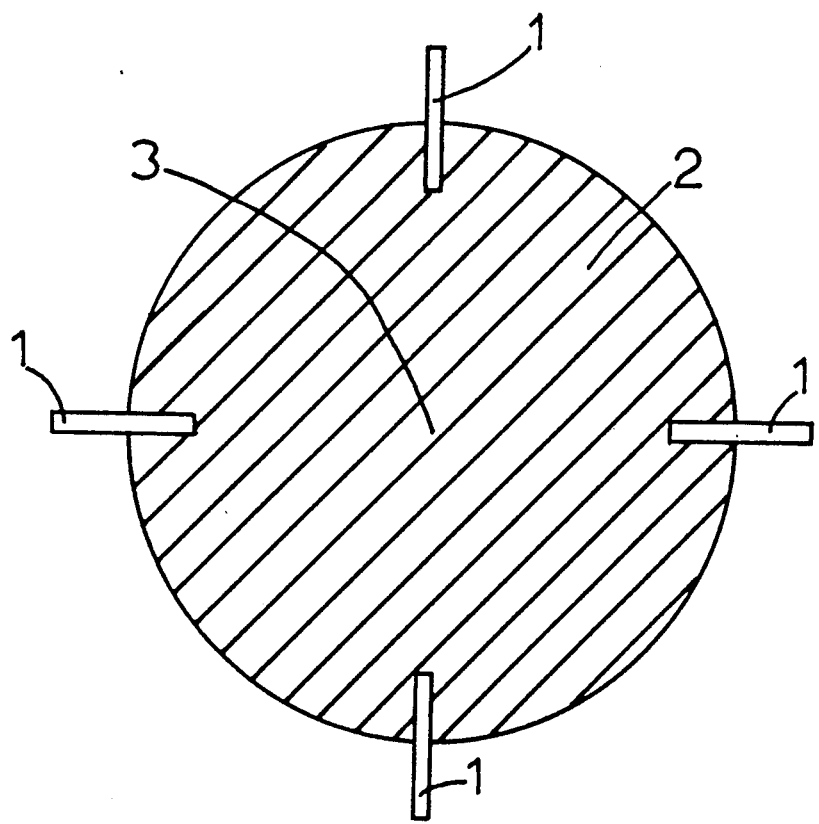
FIG. 3 shows the blades mounted on the rotor.

Styrofoam fluff is prepared as follows: New, scrap or reclaimed styrofoam is subjected to a moving router member, 1 FIGS. 2 and 3. The surface of the styrofoam is placed against the router projections, 2 FIG. 2, which are rotating. The styrofoam surface is ruptured and small pieces are torn away by the moving projections, 2 FIG. 2. The tearing projections are moving at a speed of from 100 feet to 2,000 feet per minute. A plurality of tearing members, 1 FIG. 3, are placed around a cylinder, 2 FIG. 3, which is rotated about its center, 3 FIG. 3. The space between the tearing projections, 3 FIG. 2, may be circular or square. The position of the tearing projections are different on each tearing member, 1 FIG. 3. In this way the second tearing projections will pass through the space left between the first projections, 3 FIG. 2. The edges of the projections, 2 FIG. 2, need not be sharpened as the soft styrofoam cells are easily opened and torn away. Cutting is not required or desired as tearing increases the volume of the fluff. The width of the projections, 2 FIG. 2, is from 0.5 m/m to 3.0 m/m. Small projections and higher speed provide a finer fluff.

Styrofoam fluff is useful as filling for pillows, floats, padding, high quality insulation, sound absorber, and other applications requiring very light weight filler. Styrofoam fluff is useful as artificial snow and flock for decorations. Styrofoam fluff may be mixed with sand in amounts of one-half (0.5) to ten (10) parts styrofoam fluff to sand by volume. The sand and fluff are mixed and heated to 200° C. to 250° C. with continuous agitation. The styrofoam fluff melts and collapses around the sand surfaces forming an adhesive layer on the sand particle.

When the adhesive layer is omitted from the surface of the sand particles the physical strength of the moulded member is reduced.

Silicon Dioxide $SiO_2$ is found in many different forms in nature. In large, transparent, six-sided prisms with pyramidal ends it is known as quartz or rock crystal. Sand (partly disintegrated quartz) is used in glass manufacture and in many other industries and is found on beaches and sand dunes.

The coated sand is mixed with the granulated plastic mix in amounts of from 25% to 75% granulated resin by weight. The sand and granulated polymers are placed in a compression mould the size and shape of the object to be molded, heated to 200° to 250° C., and the softened polymer mixture is compressed into the mould to remove the air. The resins bond to the coated sand to form a strong composite two phase reinforced material.

DESCRIPTION OF THE INVENTION

Discarded plastic containers having labels on the outside and residue of contents on the inside are granulated using standard industry granulating machines. The granulated resins are mixed to obtain a uniform distribution of polymer types. Sand particles, 4, FIG. 1, are surface coated with styrene, 5 FIG. 1. The coated sand is mixed with the granulated plastic 50% each by weight. The mixture of sand and resins are placed in a mould and heated 200° to 250° C. Pressure is applied to the sand and resin mixture by moving one side of the mould inward to remove air. At 225° C. the resins have melted into a viscus mass. The pressure is then increased to 500 pounds per square inch to remove all air and force the resins against the mould surface. The sand particles, 4 FIG. 1, are encased in the resins, 3 FIG. 1. The styrene coating, 5 FIG. 1, allows the liquid resins, 3 FIG. 1, to adhere to the surface of the sand, 4 FIG. 1. The surfaces, 1 and 2 FIG. 1, are smooth and formed by inner surfaces of the mould. The formed object is allowed to cool and is removed from the mould.

Various modifications can be made without departing from the spirit of this invention or the scope of the appended claims. The constants set forth in this disclosure are given as examples and are in no way final or binding. In view of the above, it will be seen that the several objects of the invention are achieved and other advantages are obtained. As many changes could be made in the above construction and methods without departing from the scope of the invention, it is intended that all matter contained in the above description shall be interpreted as illustrative and not in a limiting sense.

I claim:

1. A method of making useful objects from a mixture of granulated thermoplastics and sand by the steps of providing styrofoam fluff by placing the surface of the styrofoam against rotating router projections each having width of from 0.5 milimeters to 3.0 milimeters and moving at a speed of from 100 per minute feet to 2,000 feet per minute, allowing the moving projection to rupture the styrofoam surface and tear away pieces of the styrofoam forming a styrofoam fluff, mixing 0.5 to 10.0 parts styrofoam fluff by volume with one part sand by volume, heating the styrofoam fluff and sand mixture to 200° to 250° C. with continuous agitation allowing the heated styrofoam fluff to melt and collapse around the surface of the sand particles forming an adhesive layer on the sand particles, mixing the granulated thermoplastics and coated sand, placing the granulated thermoplastic and coated sand in a mould, applying sufficient heat to soften the thermoplastic, allowing the thermoplastic to adhere to the surface of the coated sand particles, applying sufficient pressure to remove the air from within the mould, and removing the useful moulded object from the mould.

2. A method of making useful objects from a mixture of granulated thermoplastic resins and sand by the steps of making styrofoam into styrofoam fluff by providing a plurality of tearing members around a cylinder, rotating the cylinder and tearing members, subjecting the surface of the styrofoam to the rotating tearing members, allowing the moving tearing members to rupture the styrofoam surface and tear away pieces of the styrofoam thus forming styrofoam fluff having a sectional density less than the styrofoam from which the styrofoam fluff was made, mixing styrofoam fluff with sand, heating the mixture and allowing the styrofoam fluff to melt and form a coating on the sand particles, mixing granulated thermoplastic and coated sand, placing the granulated thermoplastic and coated sand mixture in a mould, applying sufficient heat to soften the thermoplastic resins, applying sufficient pressure to remove the air from within the mould, allowing the heated thermoplastic to adhere to the surface of the coated sand particles, and removing the useful moulded object from the mould.

3. A method of making useful objects from a mixture of granulated discarded thermoplastics and sand by the steps of providing styrofoam fluff by placing the surface of the styrofoam against rotating router projections each having width of from 0.5 milimeters to 3.0 milimeters and moving at a speed of from 100 per minute feet to 2,000 feet per minute, allowing the moving projection to rupture the styrofoam surface and tear away pieces of the styrofoam forming a styrofoam fluff, mixing styrofoam fluff and sand, heating the mixture, allowing the heated styrofoam fluff to melt and collapse around the surface of the sand particles forming an adhesive coating on the sand particles, mixing the granulated thermoplastics and coated sand, placing the granulated thermoplastic and coated sand in a mould, applying sufficient heat to soften the thermoplastic, allowing the thermoplastic to adhere to the surface of the coated sand particles, applying sufficient pressure to remove the air from within the mould, and removing the useful moulded object from the mould.

4. A method as in claim 2 wherein the mould and useful object are allowed to cool before removing the useful object from the mould.

5. A method as in claim 3 wherein the mould and useful object are allowed to cool before removing the useful object from the mould.

* * * * *